June 2, 1970 J. E. CURRAN ET AL 3,516,026

METHOD AND MEANS FOR ATTENUATING COMMON MODE ELECTRICAL NOISE CURRENTS

Filed March 3, 1967 2 Sheets-Sheet 1

INVENTORS
JOHN E. CURRAN
JOHN F. O'DONNELL

BY

[signature]

AGENT

United States Patent Office 3,516,026

Patented June 2, 1970

3,516,026

METHOD AND MEANS FOR ATTENUATING COMMON MODE ELECTRICAL NOISE CURRENTS

John E. Curran, Endicott, and John F. O'Donnell, Apalachin, N.Y., assignors to International Business Machines Corporation, Armonk, N.Y., a corporation of New York Filed Mar. 3, 1967, Ser. No. 620,376

Int. Cl. H04b *3/28*

U.S. Cl. 333—12 1 Claim

ABSTRACT OF THE DISCLOSURE

The invention relates to the attenuation of high frequency noise currents and more particularly to a ferrite attenuator for attenuating high frequency noise signals in computer transmission cables and lines through which data representing signals are transmitted.

BACKGROUND OF THE INVENTION

It has been recognized for some time that high frequency noise disturbances, caused by ground shift, radiation, and static, have been the cause of malfunctions in various types of computers and data processors. In the period of the so-called "second generation" computers, processing speeds approached the megacycle range and because of the environmental conditions conducive to noise disturbances, elusive computer malfunctions occurred. Since the phenomenon constituting noise disturbances was not thoroughly understood, make-shift remedies were introduced to overcome the difficulties peculiar to a specific environment. With a change of environmental conditions, however, malfunctions reappeared which required still other make-shift remedies which met with partial or moderate success.

The introduction of the so-called "third generation" computers brought about the increase in processing speeds by at least an order of magnitude over the speeds of the second generation computers. These computers have experienced greater sensitivity to high frequency electrical noise disturbances and have been more unreliable than their prior art counterparts, a significant reason being that the pulse transition times for the data representing signals are within the frequency ranges occupied by noise currents caused by electrical noise disturbances, the noise currents being referred to hereinafter also as common mode currents and are defined as currents that flow in paths other than those defined by a circuit diagram of the system under consideration.

The principal object of the invention is directed to an attenuator of the proper characteristics, electrical and physical, to overcome the deleterious effects of common mode currents caused by spurious electrical noise disturbances introduced by electro-magnetic coupling into computer networks and transmission lines of processing systems.

Another object of the invention is in the provision of an attenuator comprised of a ferrite or a material of similar electrical properties for overcoming the malfunctions of a computer caused by internally and externally introduced high frequency electrical noise disturbances.

Yet another object lies in the provision of a split ferrite core which can be applied with ease to the transmission lines and cables of a computing complex for eliminating the detrimental effects of common mode currents caused by high frequency disturbances.

The foregoing and other objects, features and advantages of the invention will be apparent from the following more particular description of preferred embodiments of the invention, as illustrated in the accompanying drawings.

Figure 3A:
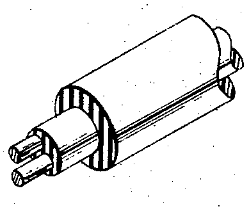
Figure 3B:
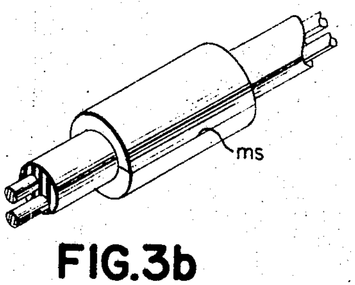

FIGS. 3*a* and 3*b* show cylindrical configurations of a contiguous attenuator and one comprised of duplicate sections.

Figure 4A:
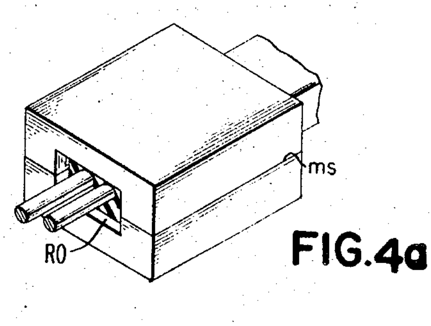
Figure 4B:
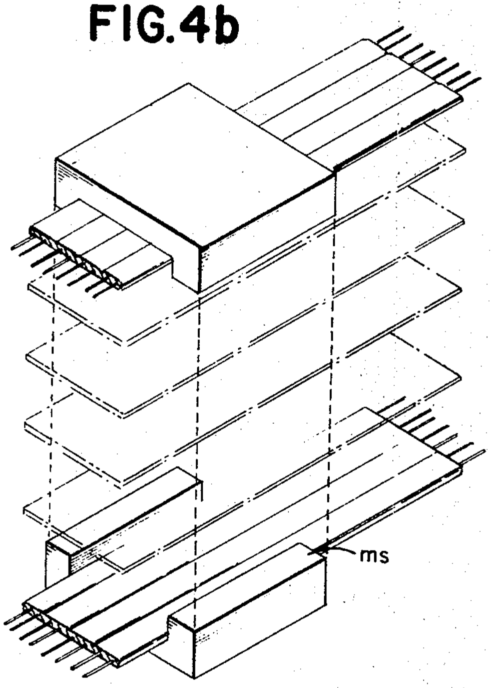

FIGS. 4*a* and 4*b* show different size openings in rectangular configured attenuators.

Figure 5A:
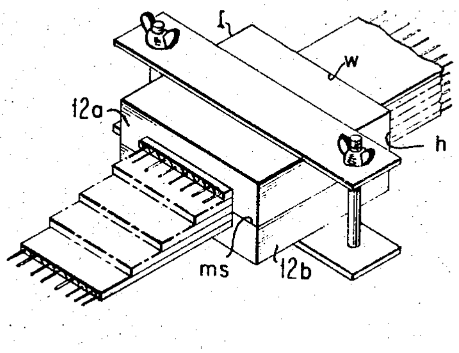

FIG. 5*a* shows a cross-section of the attenuator of FIG. 4*b* held together by clamping means.

Figure 5B:
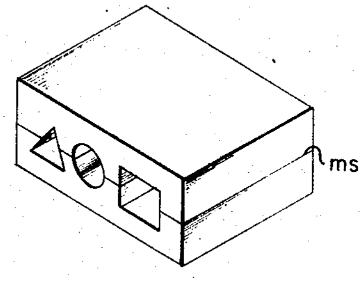

FIG. 5*b* shows a cross-section of an attenuator having a variety of differently configured openings therethrough.

Figure 1:
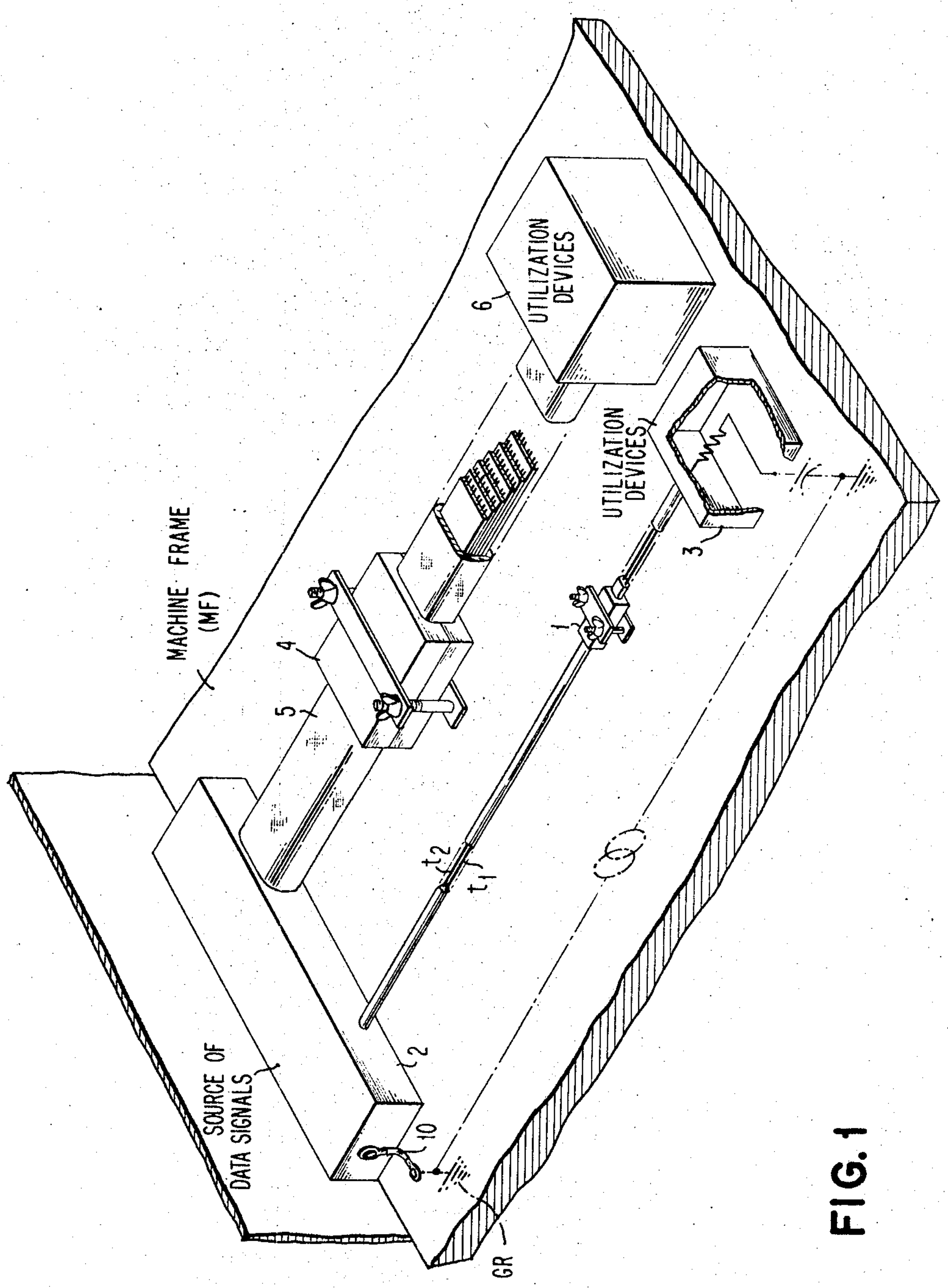
FIG. 1 is a schematic showing a portion of a data processor showing attenuators surrounding transmission lines.

The use of an attenuator to attenuate the high frequency noise currents, in the common mode, may be appreciated from the drawing of FIG. 1 which shows a schematic view of the processor main frame MF in which an attenuator surrounds transmission lines $t_1$ and $t_2$ extending between data signals source 2 and a utilization device 3. Another attenuator 4, used for the same purpose, surrounds a plurality of pairs of transmission lines 5, extending between the data signals source 2 and a utilization device 6. The data signals source 2 is connected by way of a line 10 to a ground point GR on the frame MF.

Figure 2:
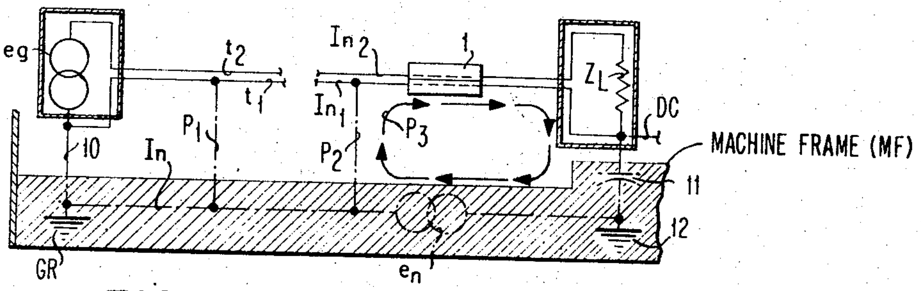
FIG. 2 is a schematic representation of a two-line transmission circuit coupled with a third path formed by the processor frame influenced by a high frequency noise disturbance.

The circuit in FIG. 2 is presented to facilitate an explanation of how attenuation is achieved of common mode currents which ordinarily cause malfunction in the computer, specifically to devices, represented by the load resistor $Z_L$ connected to the transmission lines $t_1$, $t_2$. The source of data signals in FIG. 1 is represented in FIG. 2 by a signal generator $e_g$ connected to the transmission lines $t_1$, $t_2$ which pass through the attenuator 1 and connect to load resistor $Z_L$ in turn connected to a common DC point which is a terminal to which other circuits, not shown, of the computer are connected. This DC common is the point at which maximum distributed capacitance is known to exist between a particular circuit in question and a point 12 in the machine frame MF, this maximum distributed capacitance being represented by a dotted representation of capacitor 11, and represents a common mode current path through which the common mode current must pass regardless of the point of origin of the electrical noise disturbance.

An electrical disturbance caused by radiation effects, static or a ground shift, introduces a high frequency noise current, in the common mode, in the frame MF at a region indicated schematically by a noise generator $e_n$. The frame MF acts as a path into which a noise current $I_n$ will pass and continue through the ground point GR, line 10, the transmission lines $t_1$, $t_2$, through the distributed capacitance 11 and finally return to the ground point 12 in the machine frame MF. The noise current $I_n$ divides with one component $I_{n1}$, passing through the line $t_1$, and another component $I_{n2}$ passing through the line $t_2$. Since both of these noise current components pass through the attenuator 1 in the same direction, attenuation results by virtue of a transformer action in which core material losses develop a reflectant impedance comprising resistance, inductance and capacitance as a function of the noise frequency. In the circuit paths $t_1$, $t_2$, the normal currents which represent data signals are unaffected by the presence of the attenuator by virtue of the fact that the data signal current passes through the ferrite in opposing directions to provide mutual cancellation of the normal signal current effects.

Along the transmission lines $t_1$, $t_2$, there are other regions through which common mode coupling paths, for instance, $p_1$, $p_2$, may exist in response to electrical noise disturbances occurring in regions other than that indicated by the noise generator $e_n$. By means of a simulation technique, it is found that a region of minimum common mode coupling is found along the cable extending by the path of $p_2$ and the unit and represented by the load $Z_L$. It is within this region that the attenuator is placed around the pair of transmission lines and as close as physically possible to the utilization means. Placing the attenuator around the transmission lines in the region between $p_1$, $p_2$ for example, would not be effective to attenuate common mode currents passing through a closed circulating path $p_3$. It can thus be appreciated that the region of minimum common mode coupling is the optimum region wherein the attenuator should be placed to yield maximum effective attenuation of the common mode currents passing through the transmission lines, or the like, conveying intelligence representing signals.

It has been determined that the distributed capacitance between the various cables and transmission lines, and the like, and the machine frame MF is in the order of hundreds of pfs. (picofarads) whereas the distributed capacitance between the DC common point and the frame MF is in the order of thousands of pfs. Attenuation reduces these noise currents by about a factor of as much as 10. Thus, it has been shown that the attenuator as employed in the manner described becomes effective to attenuate the noise currents when the latter are flowing through the attenuator in the same direction and pass through the points of maximum distributed capacitance through the machine frame ground path, and back into the machine ground. The noise current generally ranges from 3 milliamps and in some instances goes up to as much as one ampere in the megacycle range of frequencies. Where multiple transmission lines are in the same cable and connected to several units, cross talk effects and the noise disturbances can be minimized by isolating lines connected to an individual unit and by placing the attenuator on the isolated lines and as close to the unit as possible.

Although the contiguous configuration of the attenuator exhibits optimum electrical characteristics, the split configuration is more suitable and practical from the standpoint of ease of application and positioning in spite of a small decrease in electrical characteristics caused by air gap. In the configuration of FIGS. 3*a* and 3*b*, cables of approximately 3" diameter have been accommodated.

FIGS. 4*a* and 4*b* show split configurations having rectangular openings, the configuration of 4*a* accommodating a minimum of a single pair of transmission lines while that in FIG. 4*b* accommodating six flat cables each constituted of eight lines.

As an example of size, the configuration of FIG. 4*b* has dimensions of 1", 2" and 2½", respectively, for the *h*, *l* and *w* dimensions, the rectangular opening RO having a dimension of approximately 1⁹⁄₁₀" x ¼". It may be appreciated that the size of the split attenuators can have a wide range extending from minimum for accommodating a single pair of lines and up to a practical maximum.

FIG. 5*a* shows a clamping arrangement for holding the split ferrite sections 12*a* and 12*b* together and in alignment. Any suitable clamping structure may be employed which maintains proper alignment and with capability of providing equal and constant pressure along the mating surfaces *ms* of the split sections with a force sufficient to provide minimum air gap. The mating surfaces *ms* are ground flat with a high surface finish in order to provide intimate mating contact.

As an example, but by no means a limitation, a ferrite material, for an attenuator, was chosen having an initial permeability $\mu_0$ of not less than 1000 with a tolerance factor of ±25% at 25° C., a flux density of 4200 gauss with a tolerance factor of ±10% at a magnetizing intensity of 10 oersteds at 16K c.p.s. and at a temperature of 25° C., and a minimum inductance of 220 millihenries with 5 turns at 1 kc.

From the standpoint of economy and availability, ferrite material have been used to demonstrate the feasibility of the present invention. However, materials other than ferrites, including those which exhibit "lossy" effects, may also be used to practice the invention.

The invention has been successfully employed to eliminate the deleterious effects of high frequency common mode currents caused by noise disturbances introduced into the so-called read only memory device forming a part of the third generation computer. The read only memory devices, particularly those employing capacitor memory elements, are extremely sensitive to changes in capacity due primarily to the presence of these common mode currents. The addressing of specific capacitive elements in these memory devices is achieved by the appropriate selection of so-called bit and address cables entering the memory device. The entrance of these common mode currents by way of these bits and address cables have generated sufficient common mode current to cause improper selection of the capacitive elements to result in improper operations of the computer. The application of the split attenuator by suitable clamping means, around the desired lines and cables and as close as physically possible to the memory, resulted in the reduction of the deleterious effects produced by the noise currents.

In extreme instances, it has been found that placing an attenuator around an output cable extenoing from a device, in addition to one around an input cable to the device, has been successful in reducing common mode currents.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device for attenuating common mode coupling introduced by electro-magnetic coupling into data transmission lines of a computer having a variety of units and appropriate utilization means interconnected by said transmission lines, the latter being confined in separate cables disposed in proximity to said units, said utilization means and the frame structure of the computer, the arrangement presenting differently oriented ground planes that afford possible common mode coupling paths which may vary for each different environmental condition to which the computer may be exposed, said device comprising split sections having mating surfaces, each section having a plurality of differently configured channels extending across the mating surfaces, corresponding channels in each section, when the latter are properly mated, providing openings, through said device, having circular, triangular and square cross-sectional shapes, said device comprised of a ferrite having an initial permeability $\mu_0$ of not less than 1000 with a tolerance factor of ±25% at 25° C., a flux density of 4200 gauss with a tolerance factor of ±10% at a magnetizing intensity of 10 oersteds at 15K c.p.s. and at a temperature of 25° C., and a minimum inductance of 220 millihenries, and clamping means for securing said sections along said mating surfaces and around selected lines of said transmission lines whereby each configured opening is adapted to isolate selected lines of said cables as well as support the latter in relation to said ground planes so as to minimize cross talk between lines connecting said units and to further attenuate the effects of said common mode coupling.

References Cited

UNITED STATES PATENTS

| | | | |
|---|---|---|---|
| 2,280,950 | 4/1942 | Harder | 333—12 XR |
| 2,865,006 | 12/1958 | Sabarof | 333—12 XR |
| 3,025,480 | 3/1962 | Guanella | 333—26 XR |

HERMAN KARL SAALBACH, Primary Examiner

M. NUSSBAUM, Assistant Examiner

U.S. Cl. X.R.

333—79